(12) United States Patent
Tao

(10) Patent No.: US 10,567,620 B2
(45) Date of Patent: Feb. 18, 2020

(54) INKJET RECORDING APPARATUS

(71) Applicant: KYOCERA Document Solutions Inc., Osaka (JP)

(72) Inventor: Kozo Tao, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/125,796

(22) Filed: Sep. 10, 2018

(65) Prior Publication Data

US 2019/0084299 A1 Mar. 21, 2019

(30) Foreign Application Priority Data

Sep. 20, 2017 (JP) .................. 2017-180181

(51) Int. Cl.
| | |
|---|---|
| *B41J 2/045* | (2006.01) |
| *H04N 1/60* | (2006.01) |
| *B41J 2/21* | (2006.01) |
| *H04N 1/401* | (2006.01) |
| *G06K 15/02* | (2006.01) |
| *B41J 2/165* | (2006.01) |

(52) U.S. Cl.
CPC ........ *H04N 1/6044* (2013.01); *B41J 2/04563* (2013.01); *B41J 2/04566* (2013.01); *B41J 2/04573* (2013.01); *B41J 2/04586* (2013.01); *B41J 2/16579* (2013.01); *B41J 2/16585* (2013.01); *B41J 2/2142* (2013.01); *B41J 2/2146* (2013.01); *G06K 15/027* (2013.01); *H04N 1/4015* (2013.01)

(58) Field of Classification Search
CPC . G06K 15/027; B41J 2/04558; B41J 2/16579; B41J 2/2146; B41J 2/2142; B41J 2/16585; B41J 3/00; B41J 3/04563; B41J 2/04573; B41J 2/04586; B41J 2/04566
See application file for complete search history.

(56) References Cited

U.S. PATENT DOCUMENTS 5,596,353 A * 1/1997 Takada ................... B41J 29/393
347/14

FOREIGN PATENT DOCUMENTS

JP 2002-269543 A 9/2002

* cited by examiner

*Primary Examiner* — Sharon A. Polk
(74) *Attorney, Agent, or Firm* — Studebaker & Brackett PC

(57) ABSTRACT

An inkjet recording apparatus includes a recording head, a reading device, and a controller. The recording head ejects ink to form a sample image on a sheet. The reading device reads the sample image to generate read image data. The controller determines a start timing of reading processing by which the reading device reads the sample image. The controller causes the reading device to start the reading processing at the start timing. The controller determines a drive condition of the recording head based on the read image data.

8 Claims, 9 Drawing Sheets

INKJET RECORDING APPARATUS

INCORPORATION BY REFERENCE

The present application claims priority under 35 U.S.C. § 119 to Japanese Patent Application No. 2017-180181, filed on Sep. 20, 2017. The contents of this application are incorporated herein by reference in their entirety.

BACKGROUND

The present disclosure relates to an inkjet recording apparatus.

An inkjet printer prevents occurrence of density variation. Specifically, the inkjet printer includes a CCD scanner, a recording head including a plurality of nozzles, and a printer controller. The recording head forms a test pattern image on paper by ejecting ink from the respective nozzles. The CCD scanner reads the test pattern image formed on the paper. The printer controller acquires density data of the read image. The density data indicates density values of the ink ejected from the respective nozzles. The nozzles are controlled according to the density values of the test pattern image.

SUMMARY

An inkjet recording apparatus according to the present disclosure includes a recording head, a reading device, and a controller. The recording head ejects ink to form a sample image on a sheet. The reading device reads the sample image to generate read image data. The controller determines a start timing of reading processing by which the reading device reads the sample image. The controller causes the reading device to start the reading processing at the start timing. The controller determines a drive condition of the recording head based on the read image data.

DETAILED DESCRIPTION

Figure 1:
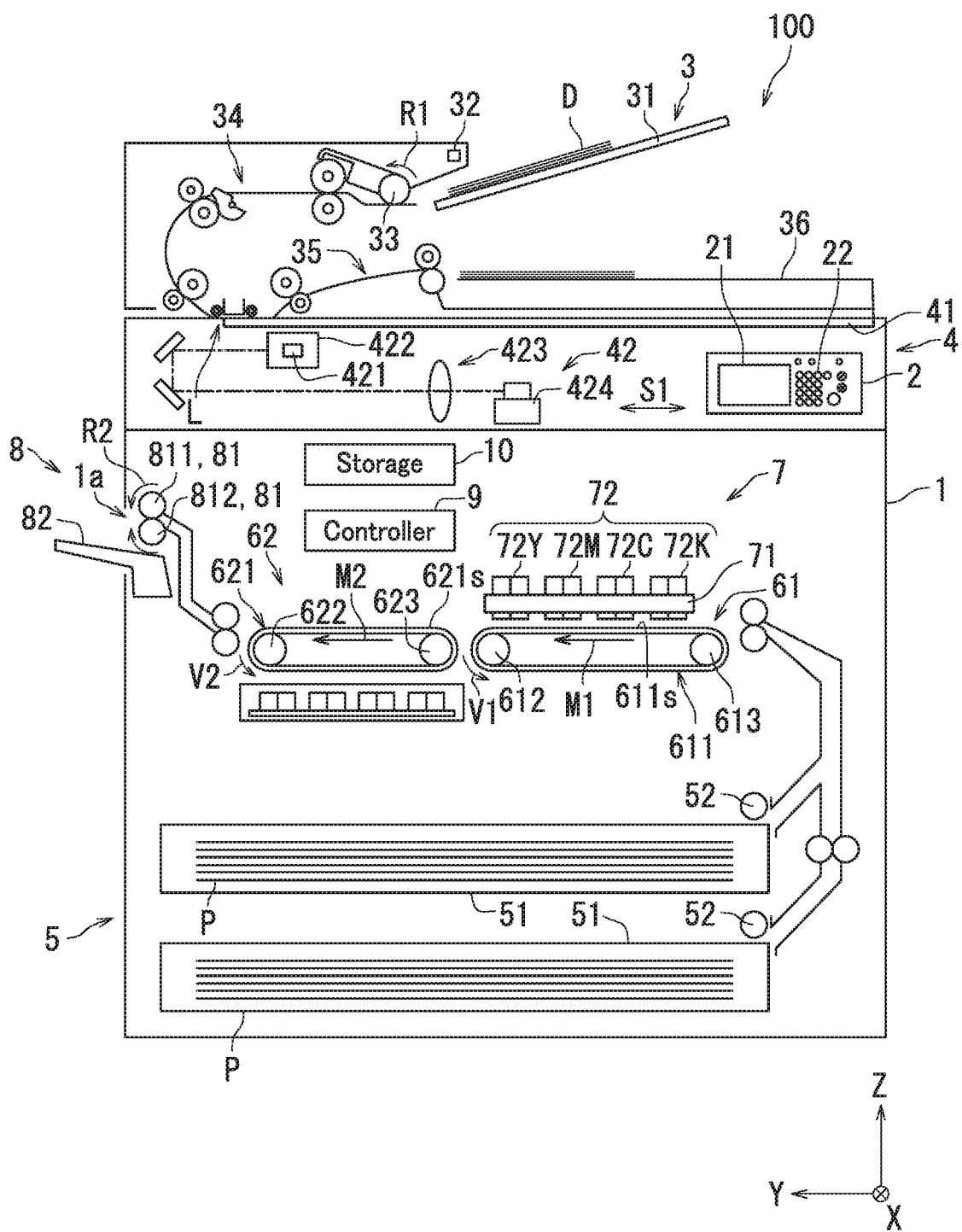
FIG. 1 is a diagram illustrating a configuration of an inkjet recording apparatus according to a first embodiment of the present disclosure.

The following describes embodiments of an inkjet recording apparatus according to the present disclosure with reference to the drawings. Note that elements that are the same or equivalent are labelled using the same reference signs in the drawings, and description of which will not be repeated. Also, an X axis, a Y axis, and a Z axis, which are orthogonal to one another, are indicated in the drawings illustrating the embodiments of the present disclosure. The Z axis is parallel to a vertical line, and the X and Y axes are parallel to a horizontal plane.

First, the following describes a configuration of an inkjet recording apparatus 100 according to an embodiment of the present disclosure with reference to FIG. 1. FIG. 1 is a diagram illustrating the configuration of the inkjet recording apparatus 100 according to a first embodiment of the present disclosure.

As illustrated in FIG. 1, the inkjet recording apparatus 100 includes a main body casing 1, an operation panel 2, a document conveyor device 3, a reading device 4, a sheet feeder 5, a first conveyance unit 61, a second conveyance unit 62, a head unit 7, an ejection device 8, a controller 9, and storage 10.

The operation panel 2 receives an instruction from an operator to the inkjet recording apparatus 100. The operation panel 2 includes a display 21 and a plurality of operation keys 22. Upon reception of the instruction from the operator, the operation panel 2 transmits a signal indicating the instruction from the operator to the controller 9. The display 21 includes for example a liquid-crystal display or an organic electroluminescent (EL) display.

The document conveyor device 3 conveys a document D. The document conveyor device 3 includes a document loading tray 31, a document detection sensor 32, a document feeding roller 33, a document conveyance section 34, a document ejection section 35, and a document exit tray 36.

The document detection sensor 32 transmits a signal indicating presence or absence of a document D placed on the document loading tray 31 to the controller 9. The document detection sensor 32 is a thru-beam sensor, for example.

The document feeding roller 33 feeds the document D placed on the document loading tray 31. Specifically, the document feeding roller 33 is driven by a motor to rotate in a first rotation direction R1 (counter-clockwise direction in FIG. 1). Through rotation of the document feeding roller 33 in the first rotation direction R1, the document D placed on the document loading tray 31 is fed sheet-by-sheet to the document conveyance section 34.

The document conveyance section 34 conveys the document D to the document ejection section 35. The document D is conveyed to the document ejection section 35 via a reading position L. The reading position L is a position at which an image on the document D can be read by the reading device 4. The document ejection section 35 ejects the document D to the document exit tray 36.

The reading device 4 reads the image on the document D to generate read image data of the document D. The read image data is transmitted to the controller 9. The reading device 4 includes a contact glass 41 and a reading mechanism 42. The contact glass 41 is located opposite to a bottom surface of the document conveyor device 3. The reading mechanism 42 includes a light source 421, a carriage 422, an optical system 423, and a charge-coupled device (CCD) image sensor 424. The light source 421 is supported by the carriage 422. The carriage 422 moves in a sub-scanning direction S1. The light source 421 irradiates a document D placed on the contact glass 41 with light while moving in the sub-scanning direction S1. The optical system 423 guides light reflected by the document D to the CCD image sensor 424. The CCD image sensor 424 converts the light guided by the optical system 423 into an electrical signal and transmits the electrical signal to the controller 9. Specifically, the CCD image sensor 424 transmits a signal indicating the read image (read image data) to the controller 9. Note that in a situation in which the reading device 4 reads an image on a document D conveyed by the document conveyor device 3, the light source 421 irradiates the reading position L with light.

The sheet feeder 5 accommodates a plurality of sheets of paper P. The sheet feeder 5 includes two cassettes 51. Each cassette 51 includes a sheet feeding roller 52. Each sheet feeding roller 52 feeds paper P accommodated in a corresponding one of the cassettes 51 sheet-by-sheet. The fed paper P is conveyed to the first conveyance unit 61. The paper P is equivalent to an example of a "sheet".

The first conveyance unit 61 conveys the paper P in a first conveyance direction M1. Specifically, the first conveyance unit 61 includes a first conveyor belt 611, a first drive roller 612, and a first driven roller 613. The first conveyor belt 611 is an endless belt wound around the first drive roller 612 and the first driven roller 613. The first drive roller 612 is driven by a motor to rotate in the counter-clockwise direction in FIG. 1. As a result, the first conveyor belt 611 circulates in a first circulation direction V1.

The first conveyor belt 611 has a first sheet loading surface 611s. The first sheet loading surface 611s is part of an outer circumferential surface of the first conveyor belt 611. The paper P is placed on the first sheet loading surface 611s. Through circulation of the first conveyor belt 611 in the first circulation direction V1, the paper P placed on the first sheet loading surface 611s is conveyed in the first conveyance direction M1.

The head unit 7 forms an image on the paper P conveyed by the first conveyor belt 611. The head unit 7 is arranged to face the first sheet loading surface 611s of the first conveyor belt 611. The head unit 7 includes a head housing 71 and four line heads 72. The head housing 71 supports the four line heads 72. The four line heads 72 eject a yellow ink, a magenta ink, a cyan ink, and a black ink, respectively. In the following description, a line head 72 that ejects the yellow ink may be referred to as a "line head 72Y", a line head 72 that ejects the magenta ink may be referred to as a "line head 72M", a line head 72 that ejects the cyan ink may be referred to as a "line head 72C", and a line head 72 that ejects the black ink may be referred to as a "line head 72K". The line heads 72K, 72C, 72M, and 72Y are arranged in this order in the first conveyance direction M1 of the paper P.

The paper P with the image formed thereon by the head unit 7 is fed to the second conveyance unit 62.

The second conveyance unit 62 is located downstream of the first conveyance unit 61 in the first conveyance direction M1. The second conveyance unit 62 conveys the paper P in a second conveyance direction M2. Specifically, the second conveyance unit 62 includes a second conveyor belt 621, a second drive roller 622, and a second driven roller 623. The second conveyor belt 621 is an endless belt wound around the second drive roller 622 and the second driven roller 623. The second drive roller 622 is driven by a motor to rotate in the counter-clockwise direction in FIG. 1. As a result, the second conveyor belt 621 circulates in a second circulation direction V2.

The second conveyor belt 621 has a second sheet loading surface 621s on which the paper P is placed. Through circulation of the second conveyor belt 621 in the second circulation direction V2, the paper P placed on the second sheet loading surface 621s is conveyed in the second conveyance direction M2. The paper P conveyed in the second conveyance direction M2 is fed to the ejection device 8.

The ejection device 8 ejects the paper P out of the main body casing 1. The ejection device 8 includes an ejection roller pair 81 and an exit tray 82. The ejection roller pair 81 includes an ejection drive roller 811 and an ejection driven roller 812. The ejection drive roller 811 is driven by a motor to rotate in a second rotation direction R2 (counter-clockwise direction in FIG. 1). The ejection driven roller 812 is rotated by rotation of the ejection drive roller 811. Through rotation of the ejection roller pair 81, the paper P is ejected out of the main body casing 1 via an exit port 1a. The exit port 1a is located in a side surface of the main body casing 1. The paper P ejected out of the main body casing 1 is placed on the exit tray 82.

The controller 9 is constituted by a processor such as a central processing unit (CPU). The controller 9 controls operation of each section of the inkjet recording apparatus 100 through execution of control programs. Also, the controller 9 includes an integrated circuit for image formation processing. The integrated circuit for image formation processing is constituted by an application specific integrated circuit (ASIC), for example.

The storage 10 stores data therein. The storage 10 is constituted by a storage device and semiconductor memory. The storage device is constituted by either or both of a hard disk drive (HDD) and a solid state drive (SSD), for example. The semiconductor memory constitutes random-access memory (RAM) and read-only memory (ROM), for example. The storage 10 stores the control programs therein.

Figure 2:
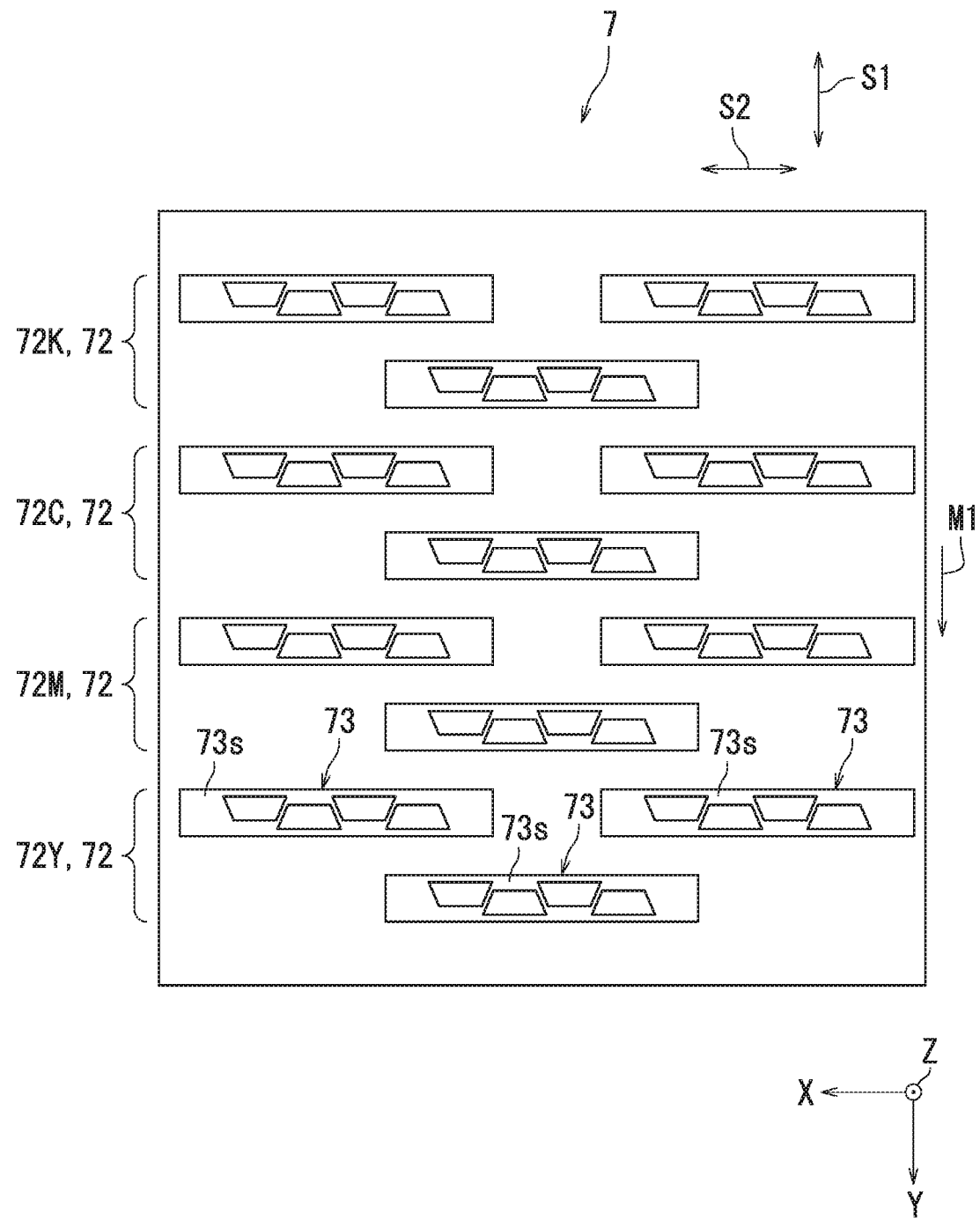
FIG. 2 is a diagram illustrating a configuration of line heads according to the first embodiment of the present disclosure.

Next, a configuration of the line heads 72 will be described with reference to FIG. 2. FIG. 2 is a diagram illustrating the configuration of the line heads 72 according to the first embodiment. Specifically, FIG. 2 illustrates the head unit 7 as seen from the first conveyance unit 61 described with reference to FIG. 1. The line heads 72Y, 72M, 72C, and 72K have the same configuration in all aspects other than that the line heads 72Y, 72M, 72C, and 72K each eject one ink of the inks of different colors. Therefore, the line head 72Y will be described as an example with reference to FIG. 2, and description of the configuration of the line heads 72M, 72C, and 72K will be omitted.

As illustrated in FIG. 2, the line head 72Y includes three recording heads 73. The three recording heads 73 are arranged in a staggered manner in a main scanning direction S2 (X axis direction).

Each recording head 73 has a nozzle surface 73s. The nozzle surface 73s faces the first sheet loading surface 611s of the first conveyor belt 611 described with reference to FIG. 1.

Figure 3:
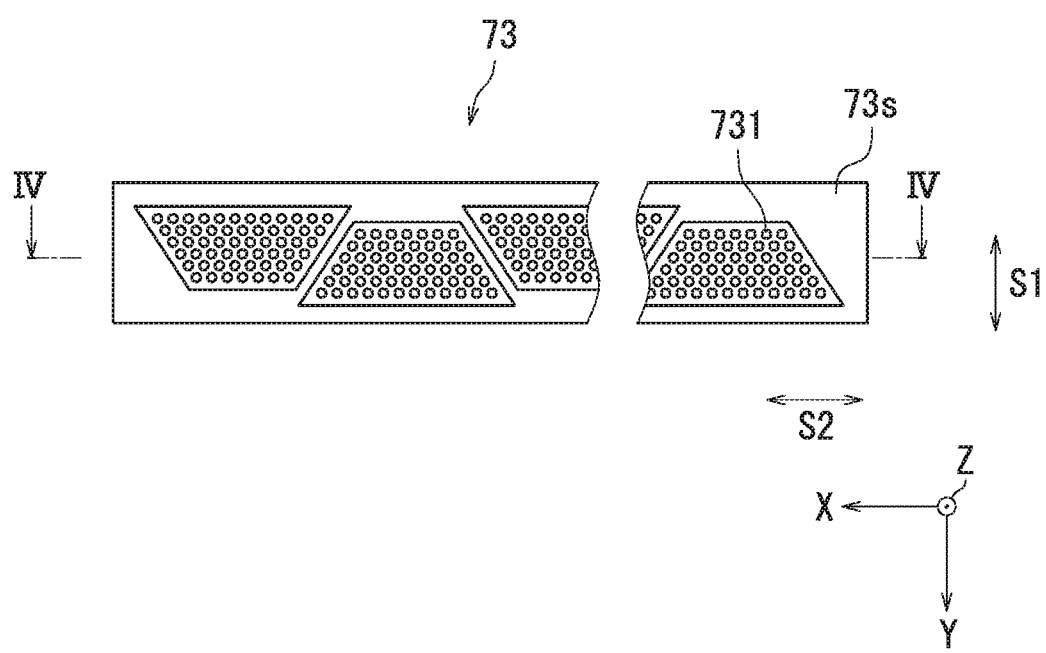
FIG. 3 is a diagram illustrating a configuration of a recording head according to the first embodiment of the present disclosure.
Figure 4:
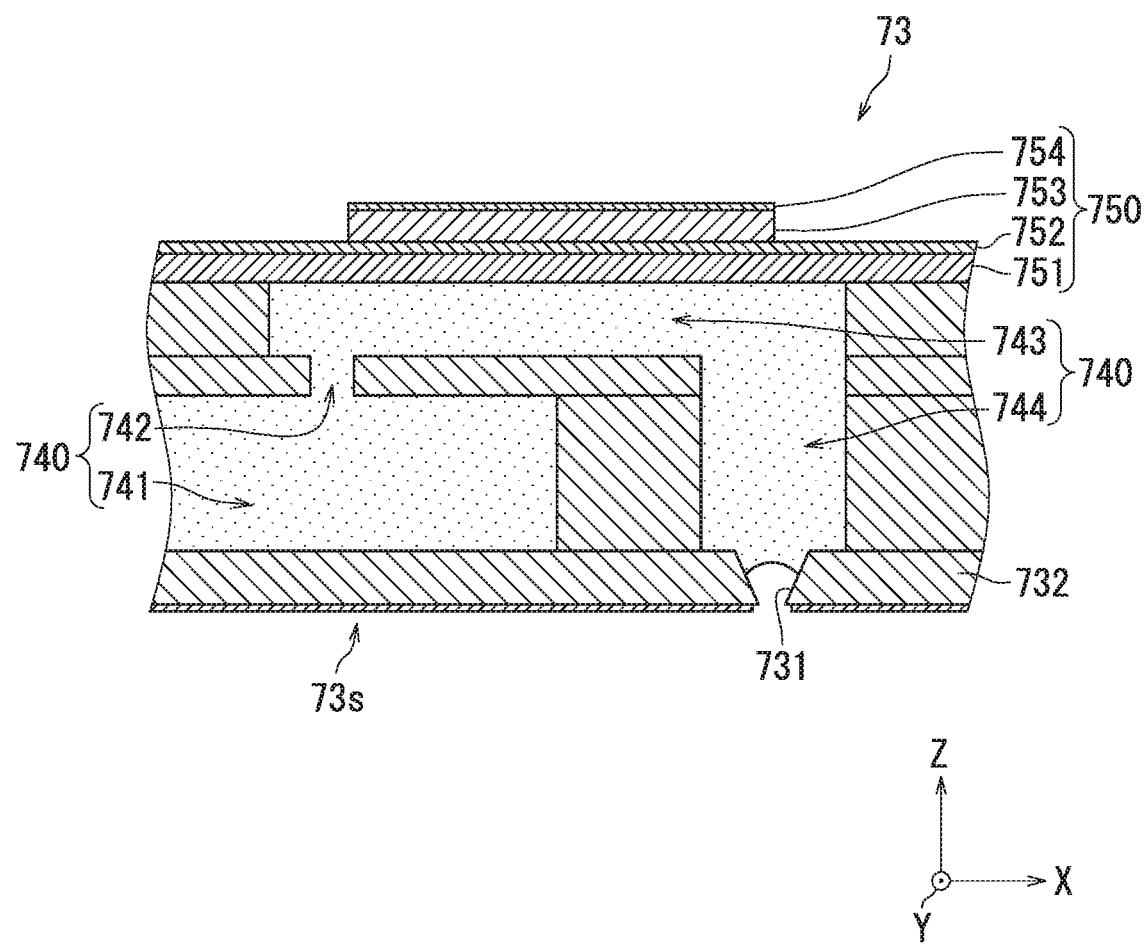
FIG. 4 is a diagram illustrating part of a cross section taken along a line IV-IV in FIG. 3 at an enlarged scale.

Next, a configuration of the recording head 73 will be described with reference to FIGS. 3 and 4. FIG. 3 is a diagram illustrating the configuration of the recording head 73 according to the first embodiment. Specifically, FIG. 3 illustrates the nozzle surface 73s of the recording head 73. FIG. 4 is a diagram illustrating part of a cross section taken along a line IV-IV in FIG. 3 at an enlarged scale.

As illustrated in FIG. 3, the recording head 73 includes a plurality of nozzles 731. The nozzles 731 are arranged in the sub-scanning direction S1 (Y axis direction) and the main scanning direction S2 (X axis direction). Each nozzle 731 ejects ink. As a result, an image is formed on the paper P.

As illustrated in FIG. 4, the recording head 73 includes a nozzle plate 732, a flow channel section 740, and a pressurizing section 750 in addition to the nozzles 731.

The nozzle plate 732 has the nozzle surface 73s. The nozzle plate 732 has a plurality of openings. The openings correspond to the respective nozzles 731.

The flow channel section 740 includes an ink tank, a common flow channel 741, a plurality of supply holes 742, a plurality of pressure chambers 743, and a plurality of nozzle flow channels 744. The supply holes 742, the pressure chambers 743, and the nozzle flow channels 744 correspond to the respective nozzles 731.

Ink is stored in the ink tank. Specifically, the black ink is stored in the ink tank of each recording head 73 included in the line head 72K. The cyan ink is stored in the ink tank of each recording head 73 included in the line head 72C. The magenta ink is stored in the ink tank of each recording head 73 included in the line head 72M. The yellow ink is stored in the ink tank of each recording head 73 included in the line head 72Y.

The common flow channel 741 is connected to the ink tank. The ink flows into the common flow channel 741 from the ink tank. The common flow channel 741 communicates with the pressure chambers 743 via the respective supply holes 742. The ink is supplied from the ink tank to each pressure chamber 743 via the common flow channel 741 and a corresponding supply hole 742. The pressure chambers 743 communicate with the respective nozzle flow channels 744. The nozzle flow channels 744 communicate with the respective nozzles 731.

The pressurizing section 750 applies pressure to the ink within the pressure chambers 743. The pressurizing section 750 includes a vibration plate 751, a common electrode 752, a plurality of piezoelectric elements 753, and a plurality of individual electrodes 754. The vibration plate 751, the common electrode 752, the piezoelectric elements 753, and the individual electrodes 754 are arranged in this order in a direction away from the nozzle surface 73s.

The vibration plate 751 constitutes a wall of the pressure chambers 743 far from the nozzle surface 73s. The vibration plate 751 and the common electrode 752 continuously extend over the pressure chambers 743. The piezoelectric elements 753 and the individual electrodes 754 correspond to the respective pressure chambers 743. The piezoelectric elements 753 are sandwiched between the common electrode 752 and the respective individual electrodes 754.

When a drive voltage is applied to each individual electrode 754, the piezoelectric elements 753 sandwiched between the common electrode 752 and the respective individual electrodes 754 on which the drive voltage is applied are transformed, and areas of the vibration plate 751 located opposite to the transformed piezoelectric elements 753 vibrate. Through this vibration, pressure is applied to the ink within the pressure chambers 743 corresponding to the vibrating areas of the vibration plate 751. As a result, the ink within the pressure chambers 743 flows through the respective nozzle flow channels 744 and is ejected as ink droplets via the respective nozzles 731. Note that the drive voltage is an example of a drive condition.

Figure 5:
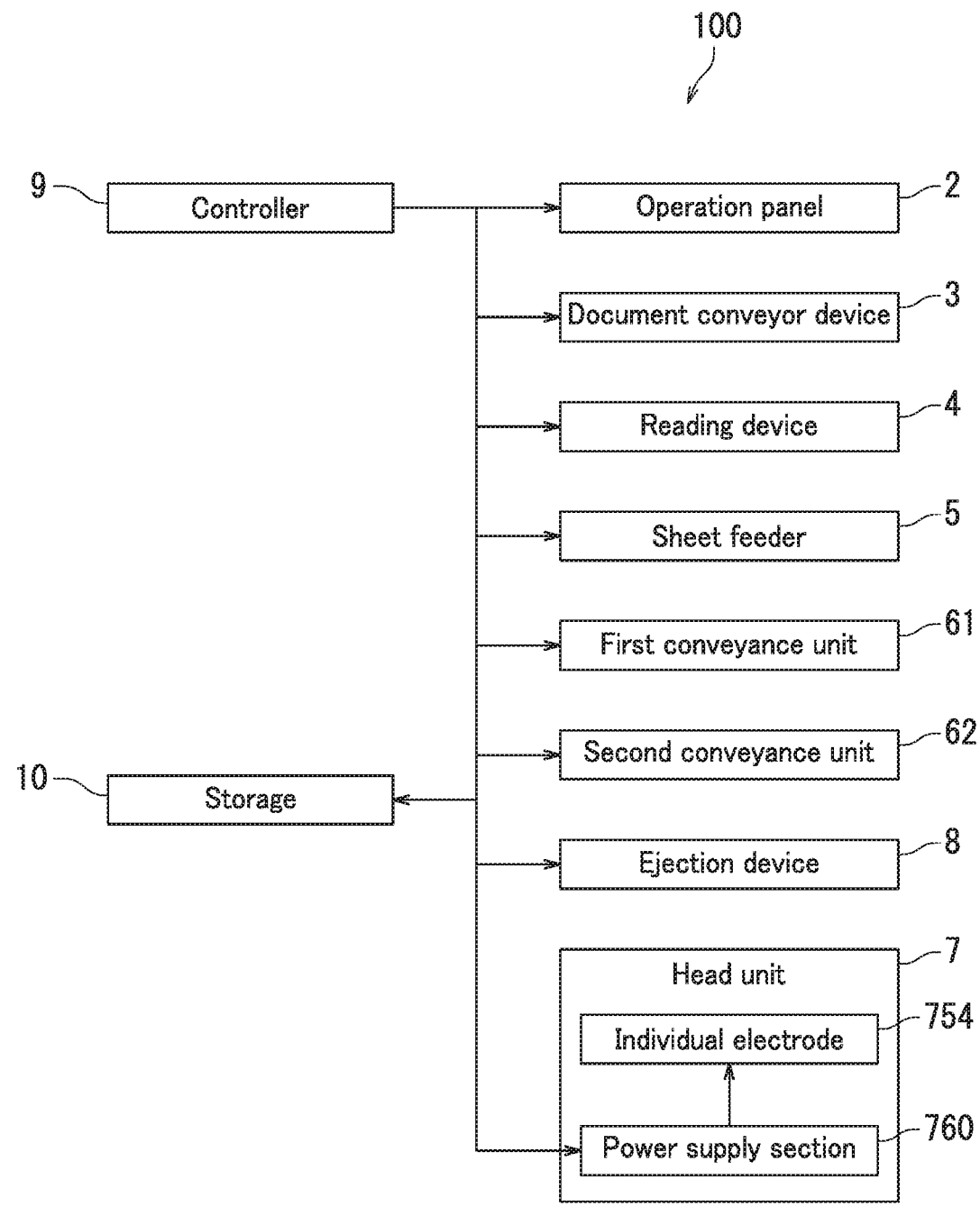
FIG. 5 is a block diagram illustrating the configuration of the inkjet recording apparatus according to the first embodiment of the present disclosure.

The following further describes the configuration of the inkjet recording apparatus 100 with reference to FIGS. 1 to 5. FIG. 5 is a block diagram illustrating the configuration of the inkjet recording apparatus 100 according to the first embodiment.

As illustrated in FIG. 5, the head unit 7 further includes a power supply section 760, which is an example of a head driving section. The power supply section 760 applies the drive voltage to the individual electrodes 754. A voltage value of the drive voltage is determined by correcting a preset standard voltage value with a correction coefficient. The standard voltage value is 20 V, for example. The controller 9 calculates the correction coefficient according to characteristics (inter-individual difference) of the nozzles 731 and determines the voltage value of the drive voltage based on the calculated correction coefficient. The correction coefficient is calculated for each nozzle 731. Alternatively, the correction coefficient is calculated for each line head 72. Alternatively, the correction coefficient is calculated for each unit including some of the nozzles 731. For example, a recording head 73 includes a plurality of units. The controller 9 controls operation of the power supply section 760 so that the power supply section 760 applies drive voltages of determined voltage values to the respective individual electrodes 754. Through the above, the respective nozzles 731 can be controlled properly.

The controller 9 executes drive condition measurement processing. Specifically, the controller 9 causes the head unit 7 to print a sample image and then causes the reading device 4 to read the sample image. Solid images of four colors are for example printed as sample images. The solid images of the four colors are a solid image of a yellow color, a solid image of a cyan color, a solid image of a magenta color, and a solid image of a black color. The solid image of the yellow color is formed by the line head 72Y, the solid image of the magenta color is formed by the line head 72M, the solid image of the cyan color is formed by the line head 72C, and the solid image of the black color is formed by the line head 72K. The number of pixels constituting each solid image is the same as the number of the plurality of nozzles 731. Each nozzle 731 ejects ink corresponding to one pixel onto the paper P. The solid image of each color extends in the sub-scanning direction S1 and the main scanning direction S2.

Each sample image is read by the reading device 4 after a wait period has elapsed from completion of printing.

The controller 9 determines a timing at which the reading device 4 is to start reading the sample image. In the following description, processing for reading the sample image will be referred to as "reading processing" and the timing for starting the reading processing will be referred to as a "start timing". In the present embodiment, the start timing of the reading processing of the sample image indicates a timing (time point) calculated by adding the wait period to a time point at which ejection of the paper P onto the exit tray 82 is completed. The paper P is the paper P with the sample image printed thereon. In the following description, the time point at which ejection of the paper P with the sample image printed thereon onto the exit tray 82 is completed will be referred to as an "ejection completion time point".

The controller 9 acquires density values of respective pixels constituting the sample image read by the reading device 4 based on read image data transmitted from the reading device 4. The controller 9 calculates correction coefficients for voltage values of drive voltages to be applied to the respective individual electrodes 754 based on the acquired density values of the respective pixels.

Figure 6:
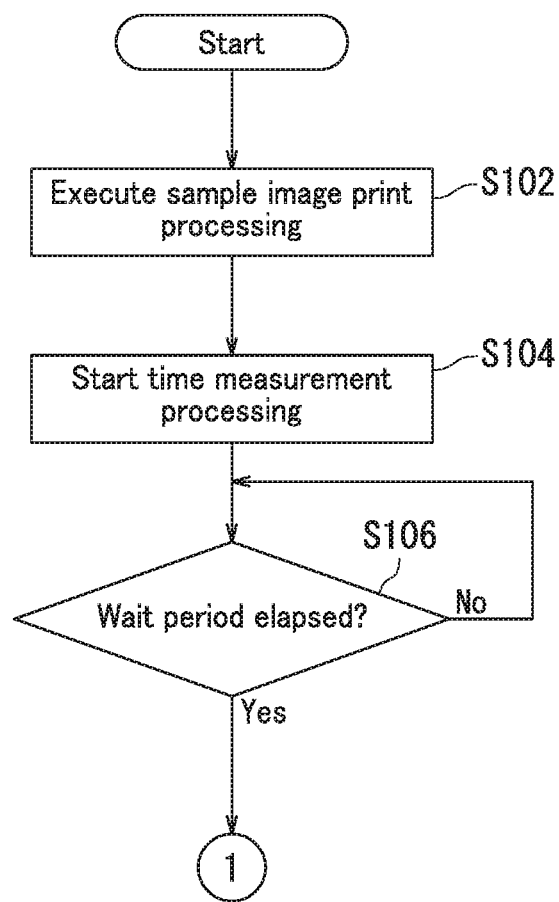
FIG. 6 is a flowchart illustrating a former half of drive condition measurement processing according to the first embodiment of the present disclosure.
Figure 7:
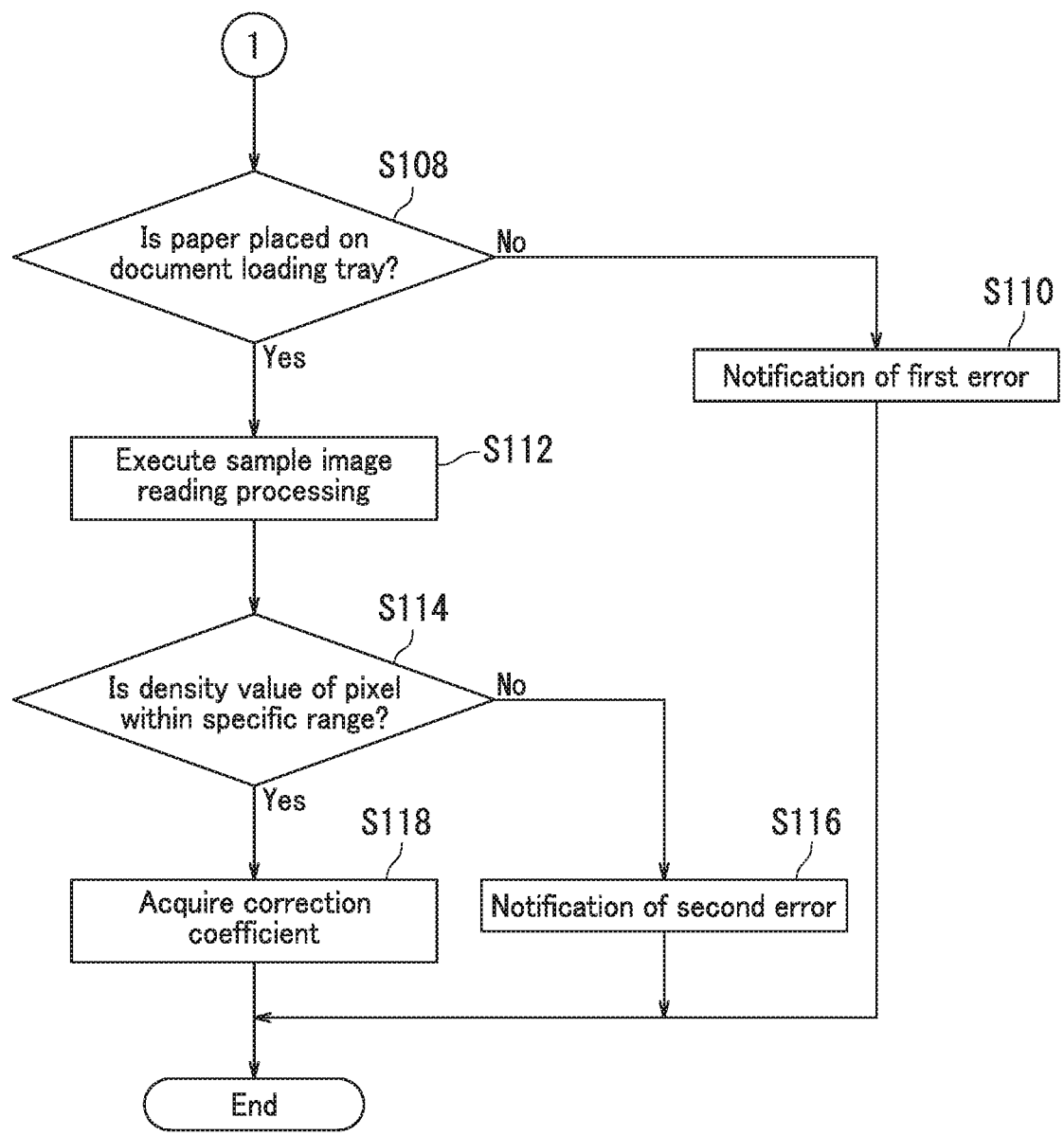
FIG. 7 is a flowchart illustrating a latter half of the drive condition measurement processing according to the first embodiment of the present disclosure.

The following describes the drive condition measurement processing according to the first embodiment with reference to FIGS. 1 to 7. FIG. 6 is a flowchart illustrating a former half of the drive condition measurement processing according to the first embodiment. FIG. 7 is a flowchart illustrating a latter half of the drive condition measurement processing according to the first embodiment. The drive condition measurement processing is started when the controller 9 receives a signal indicating a start of the drive condition measurement processing from the operation panel 2.

As illustrated in FIG. 6, upon reception of the signal indicating the start of the drive condition measurement processing from the operation panel 2, the controller 9 executes sample image print processing (Step S102). Specifically, the controller 9 reads image data indicating the sample image (sample image data) from the storage 10 and causes the head unit 7 to perform printing based on the sample image data. The sample image data is stored in the storage 10 in advance. In the sample image print processing, the controller 9 controls the power supply section 760 to apply a sample voltage to each individual electrode 754. A voltage value of the sample voltage is preset. The voltage value of the sample voltage is 20 V, for example.

Then, the controller 9 starts time measurement processing (Step S104). In the present embodiment, the controller 9 starts the time measurement processing when ejection of the paper P with the sample image printed thereon onto the exit tray 82 is completed. The controller 9 determines that the ejection of the paper P onto the exit tray 82 is completed when the ejection roller pair 81 stops rotating for example, and then starts the time measurement processing. The paper P ejected onto the exit tray 82 is to be placed on the document loading tray 31 of the document conveyor device 3 by an operator.

Then, the controller 9 determines whether or not the wait period has elapsed from the start of the time measurement processing (Step S106). The wait period is 10 seconds in the present embodiment. The controller 9 causes the display 21 of the operation panel 2 (see FIG. 1) to display the rest of the wait period. Through the above, the operator can be prompted to place the paper P on the document loading tray 31.

When determining that the wait period has not elapsed (No at Step S106), the controller 9 waits until the wait period elapses. By contrast, when determining that the wait period has elapsed (Yes at Step S106), the controller 9 determines whether or not the paper P is placed on the document loading tray 31 as illustrated in FIG. 7 (Step S108). Specifically, the controller 9 determines whether or not the paper P is placed on the document loading tray 31 based on a signal transmitted from the document detection sensor 32. When determining that the paper P is not placed on the document loading tray 31 (No at Step S108), the controller 9 performs notification of a first error (Step S110). Specifically, the controller 9 causes the display 21 to display a message indicating the absence of the paper P on the document loading tray 31 and a message instructing restart of the routine from the sample image print processing. After notification of the first error, the controller 9 ends the drive condition measurement processing.

By contrast, when determining that the paper P is placed on the document loading tray 31 (Yes at Step S108), the controller 9 causes the reading device 4 to execute the reading processing on the paper P with the sample image printed thereon (Step S112). For example, the controller 9 causes the document feeding roller 33 of the document conveyor device 3 to start rotating.

Then, the controller 9 successively determines whether or not density values of respective pixels constituting the sample image are within specific ranges (Step S114). Specifically, upon reception of the read image data (brightness value data) from the reading device 4, the controller 9 acquires the density values of the respective pixels based on the read image data. The controller 9 successively determines whether or not the acquired density values of the respective pixels are within the specific ranges. A specific range is typically preset for each pixel based on a theoretical value of density of the pixel. In a situation in which ink has not been ejected due to ejection failure of a nozzle 731, for example, the controller 9 determines that an acquired density value is not within the specific range. When determining that the acquired density value is not within the specific range (No at Step S114), the controller 9 performs notification of a second error (Step S116). Specifically, the controller 9 causes the display 21 to display a message indicating the presence of an abnormal density value of the sample image and a message instructing restart of the routine from the sample image print processing. After notification of the second error, the controller 9 ends the drive condition measurement processing.

By contrast, when determining that the acquired density values are all within the respective specific ranges (Yes at Step S114), the controller 9 successively calculates correction coefficients for drive voltages to be applied to the respective individual electrodes 754 (Step S118). Specifically, with respect to each pixel, the controller 9 calculates a difference between a theoretical value of density of the pixel and a density value of the pixel acquired through application of the sample voltage. Based on the calculated difference, the controller 9 successively calculates the correction coefficients for the drive voltages to be applied to the respective individual electrodes 754. After calculating all of the correction coefficients for the drive voltages to be applied to the respective individual electrodes 754, the controller 9 ends the drive condition measurement processing. The controller 9 sets voltage values determined by correcting the standard voltage value with the calculated correction coefficients as voltage values of the drive voltages to be applied to the respective individual electrodes 754. As a result, the respective nozzles 731 can be controlled properly.

Note that the operator may cause the controller 9 to perform the routine from Step S102 to Step S118 a plurality of times by varying the voltage value of the sample voltage. In this situation, density values corresponding to sample voltages of different voltage values can be acquired for each pixel. Therefore, a correction coefficient for a voltage value of a drive voltage to be applied to an individual electrode 754 can be calculated based on density values of a pixel corresponding to the sample voltages of different voltage values. For example, the correction coefficient can be calculated based on a gradient or an average of the density values. The above enables more proper control of each nozzle 731.

Through the above, the first embodiment has been described. According to the present embodiment, the controller 9 measures a time from completion of the sample image print processing. Once the wait period elapses, the controller 9 causes the reading device 4 to start the reading processing on the paper P with the sample image printed thereon. Therefore, the controller 9 can acquire a density value of ink at a constant degree of permeation of the ink to the paper P (i.e., degree of dryness of the ink). Therefore, the controller 9 can calculate a proper correction coefficient. As a result, each nozzle 731 can be controlled properly.

Also, according to the present embodiment, notification of the first error is performed when the paper P is not placed on the document loading tray 31. The first error gives an instruction for restarting the routine from the sample image print processing. Therefore, the controller 9 can acquire a density value of ink at a constant degree of permeation of the ink to the paper P (i.e., degree of dryness of the ink).

Also, according to the present embodiment, notification of the second error is performed when a density value of a pixel of the sample image is not within the specific range. The second error gives an instruction for restarting the routine from the sample image print processing. Therefore, it is possible to prevent a situation in which the correction coefficient is calculated based on a density value out of the specific range. As a result, the correction coefficient can be calculated more properly.

In the present embodiment, the controller 9 determines that ejection of the paper P onto the exit tray 82 is completed when the ejection roller pair 81 stops rotating. In an alternative example, the ejection device 8 may further include a sheet detection sensor and the controller 9 may determine that ejection of the paper P onto the exit tray 82 is completed when the controller 9 receives from the sheet detection sensor a signal indicating that the paper P is ejected onto the exit tray 82.

Also, the present embodiment has been described about a case where the start timing of the reading processing is the time point calculated by adding the wait period to the ejection completion time point. Alternatively, the start timing of the reading processing may be a time point calculated by adding the wait period to a time point at which ejection of the ink to the paper P from the respective nozzles 731 is completed. In other words, the controller 9 may start the time measurement processing upon completion of ejection of the ink to the paper P from the respective nozzles 731.

Also, the present embodiment has been described about a case where the sample image is the solid image. Alternatively, the sample image may further include a marking image. The marking image is an image for associating the pixels constituting the sample image with the respective nozzles 731. The controller 9 determines whether or not the position of the marking image included in the sample image coincides with a predetermined position based on the read image data transmitted from the reading device 4. In a situation in which the document D is obliquely placed on the document loading tray 31 (see FIG. 1), for example, the position of the marking image does not coincide with the predetermined position. When the position of the marking image does not coincide with the predetermined position, the pixels may not correspond to the respective nozzles 731, resulting in failure to acquire density values of pixels corresponding to the respective nozzles 731.

When the controller 9 determines that the position of the marking image does not coincide with the predetermined position, the controller 9 notifies the operator of restarting the routine from the sample image print processing. As a result, the controller 9 can calculate correction coefficients based on density values of pixels corresponding to the respective nozzles 731. Therefore, the nozzles 731 can be controlled more properly.

In a situation in which the routine from Step S102 to Step S118 is repeated a plurality of times in the drive condition measurement processing, each sample image may further include an order identification image that indicates an order in which sample images are to be read by the reading device 4 (i.e., order in which the sample images are printed). In the above situation, when the sample images are read by the reading device 4 in an order differing from the order indicated by the order identification images, the controller 9 notifies the operator of restarting the routine from the sample image print processing. Through the above, the controller 9 can calculate the correction coefficients more accurately.

Second Embodiment

Figure 8:
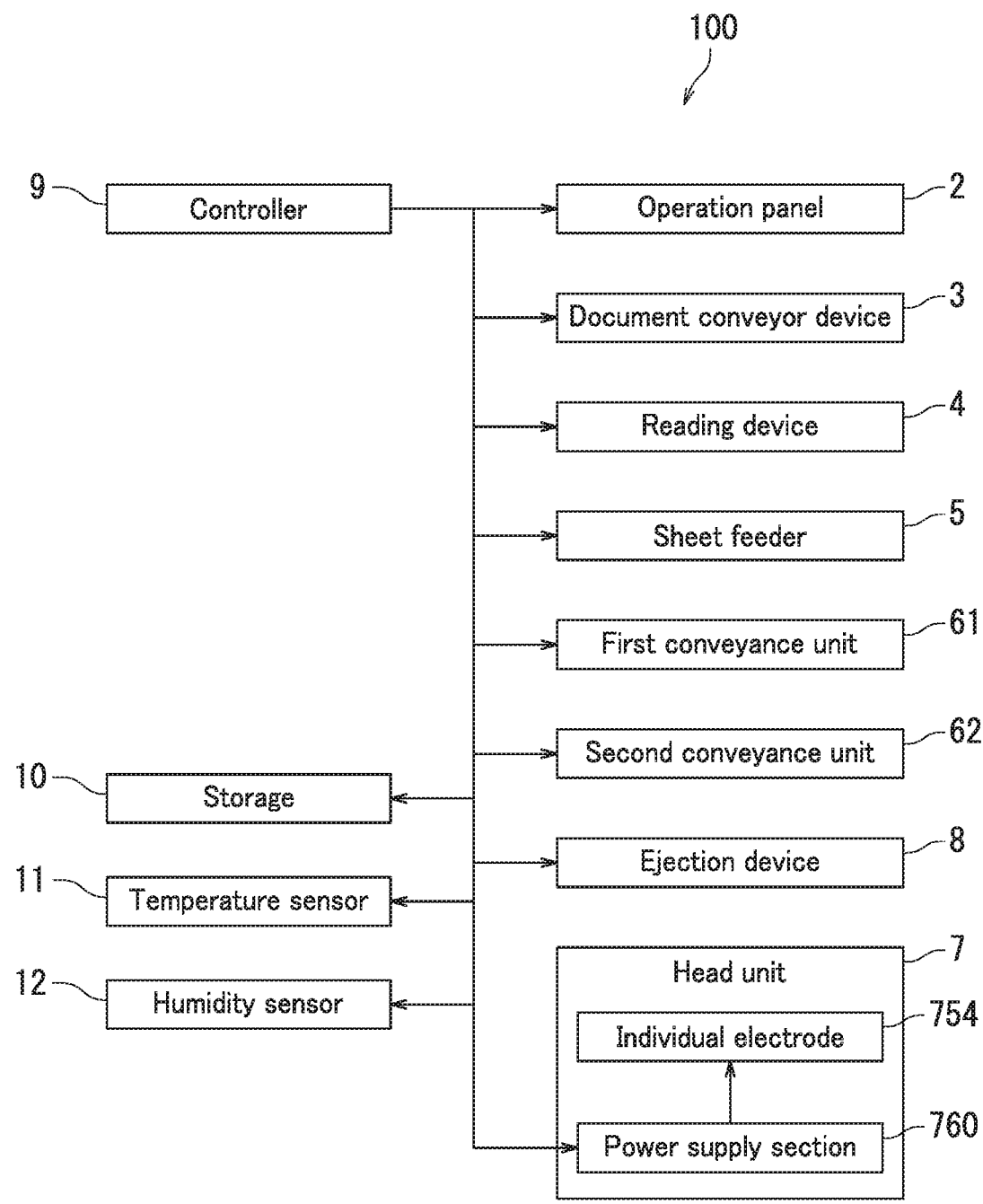
FIG. 8 is a block diagram illustrating a configuration of an inkjet recording apparatus according to a second embodiment of the present disclosure.
Figure 9:
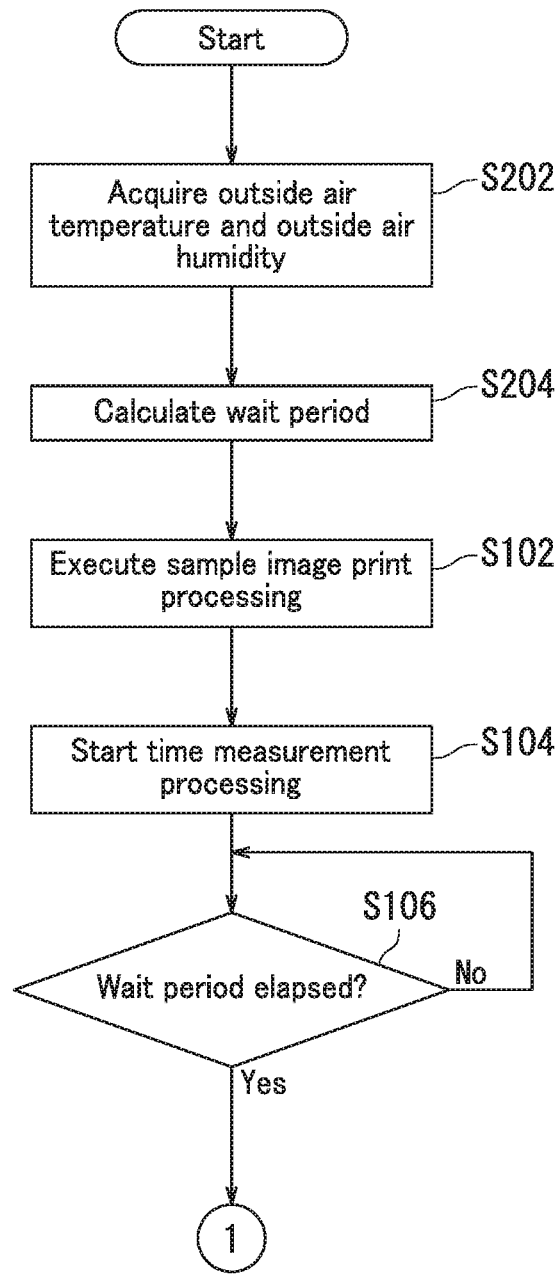
FIG. 9 is a flowchart illustrating a former half of drive condition measurement processing according to the second embodiment of the present disclosure.

The following describes a second embodiment of the present disclosure with reference to FIGS. 7 to 9. The second embodiment differs from the first embodiment in that the start timing of the reading processing is changed according to a temperature and a humidity. The following describes difference between the second embodiment and the first embodiment, and overlapping description will be omitted.

First, a configuration of an inkjet recording apparatus 100 according to the second embodiment will be described with reference to FIG. 8. FIG. 8 is a block diagram illustrating the configuration of the inkjet recording apparatus 100 according to the second embodiment.

As illustrated in FIG. 8, the inkjet recording apparatus 100 further includes a temperature sensor 11 and a humidity sensor 12.

The temperature sensor 11 measures a temperature of the outside of the main body casing 1. In the following description, the temperature of the outside of the main body casing 1 will be referred to as an "outside air temperature". The temperature sensor 11 transmits a signal indicating the outside air temperature to the controller 9.

The humidity sensor 12 measures a humidity of the outside of the main body casing 1. In the following description, the humidity of the outside of the main body casing 1 will be referred to as an "outside air humidity". The humidity sensor 12 transmits a signal indicating the outside air humidity to the controller 9.

The controller 9 acquires the outside air temperature based on the signal transmitted from the temperature sensor 11. The controller 9 also acquires the outside air humidity based on the signal transmitted from the humidity sensor 12. In the present embodiment, the controller 9 determines the wait period based on the outside air temperature and the outside air humidity. Specifically, in a situation in which the outside air temperature is higher than a standard temperature, the controller 9 sets the wait period to be shorter than a standard period. In a situation in which the outside air temperature is lower than the standard temperature, the controller 9 sets the wait period to be longer than the standard period. In a situation in which the outside air humidity is higher than a standard humidity, the controller 9 sets the wait period to be longer than the standard period. In a situation in which the outside air humidity is lower than the standard humidity, the controller 9 sets the wait period to be shorter than the standard period. The standard period is a specific period preset by the operator assuming a situation in which the outside air temperature is equal to the standard temperature and the outside air humidity is equal to the standard humidity. When the wait period is determined based on the outside air temperature and the outside air humidity, a degree of permeation of ink to the paper P can be made constant in acquisition of a density value of each pixel. The standard temperature and the standard humidity are stored in the storage 10 in advance. In the present embodiment, the standard temperature is for example 23° C. and the standard humidity is for example 60%.

The following describes drive condition measurement processing according to the second embodiment with reference to FIGS. 7 to 9. FIG. 9 is a flowchart illustrating the drive condition measurement processing according to the second embodiment.

As illustrated in FIG. 9, upon reception of a signal indicating a start of the drive condition measurement processing, the controller 9 acquires the outside air temperature and the outside air humidity (Step S202). Then, the controller 9 calculates the wait period based on the acquired outside air temperature and the acquired outside air humidity (Step S204), and executes the sample image print processing (Step S102). Thereafter, the same routine (Step S102 to Step S118) as that in the drive condition measurement processing described with reference to FIGS. 6 and 7 is performed. Note that Steps S202 and S204 may be performed between Step S102 and Step S104, for example.

Through the above, the second embodiment has been described. The degree of permeation of ink to the paper P may vary according to the outside air temperature and the outside air humidity. According to the present embodiment, the controller 9 calculates the wait period based on the outside air temperature and the outside air humidity. Therefore, even when environmental conditions vary, the controller 9 can acquire a density value of ink at a constant degree of permeation of the ink to the paper P. As a result, the controller 9 can calculate the correction coefficient more properly.

Although the controller 9 calculates the wait period based on the outside air temperature and the outside air humidity in the present embodiment, the controller 9 may calculate the wait period based on either of the outside air temperature and the outside air humidity. In this case, either of the temperature sensor 11 and the humidity sensor 12 can be omitted from the inkjet recording apparatus 100.

Through the above, the embodiments of the present disclosure have been described with reference to the drawings (FIGS. 1 to 9). The present disclosure is not limited to the above embodiments and may be practiced in various manners within a scope not departing from the gist of the present disclosure. The configurations described in the above embodiments are merely examples and should not be taken as specific limitations. Various alterations may be made within a scope not substantially departing from the effects of the present disclosure.

For example, although the embodiments of the present disclosure have been described about a case where the present disclosure is applied to the line head unit, the present disclosure is also applicable to a serial head unit.

Although the embodiments of the present disclosure have been described about a case where the present disclosure is applied to the head unit of a piezoelectric inkjet system, the present disclosure is also applicable to a head unit of a thermal inkjet system.

What is claimed is:

1. An inkjet recording apparatus comprising:
    a recording head configured to eject ink to form a sample image on a sheet;
    a reading device configured to read the sample image to generate read image data;
    a casing accommodating the recording head therein; and
    a controller configured to determine a start timing of reading processing by which the reading device reads the sample image, wherein
    the start timing is a time point calculated by adding a wait period to a time point at which ejection of the sheet to an outside of the casing is completed,
    the controller causes the reading device to start the reading processing at the start timing, and
    the controller determines a drive condition of the recording head based on the read image data.

2. The inkjet recording apparatus according to claim 1, further comprising
    a temperature sensor configured to measure a temperature of the outside of the casing, wherein
    the controller determines the start timing based on the temperature measured by the temperature sensor.

3. The inkjet recording apparatus according to claim 1, further comprising
    a humidity sensor configured to measure a humidity of the outside of the casing, wherein
    the controller determines the start timing based on the humidity measured by the humidity sensor.

4. The inkjet recording apparatus according to claim 1, further comprising
    a head driving section configured to drive the recording head, wherein
    the drive condition includes a voltage value of a drive voltage to be applied to the recording head by the head driving section.

5. The inkjet recording apparatus according to claim 4, wherein
    the recording head forms a plurality of the sample images,
    the sample images are formed by varying the drive condition,
    the reading device successively reads the sample images to generate a plurality of pieces of read image data, and
    based on the plurality of pieces of read image data, the controller determines the voltage value of the drive voltage to be applied to the recording head by the head driving section.

6. The inkjet recording apparatus according to claim 5, wherein
    the recording head has a nozzle surface including a plurality of nozzles,
    each of the sample images is constituted by pixels corresponding to the respective nozzles,
    the controller acquires density values of the pixels corresponding to the respective nozzles, and calculates, based on the density values of the respective pixels, voltage values of drive voltages to be applied to the recording head.

7. An inkjet recording apparatus comprising:
    a recording head configured to eject ink to form a sample image on a sheet;
    a reading device configured to read the sample image to generate read image data;
    a controller configured to determine a start timing of reading processing by which the reading device reads the sample image;
    an exit tray on which the sheet with the sample image formed thereon by the recording head is to be ejected; and
    a document conveyor device configured to convey the sheet ejected to the exit tray to a position at which the sample image formed on the sheet can be read by the reading device, wherein
    the controller causes the reading device to start the reading processing at the start timing,
    the controller determines a drive condition of the recording head based on the read image data,
    the document conveyor device includes a document loading tray on which the sheet ejected to the exit tray is to be placed,
    the controller starts time measurement processing when the sheet with the sample image formed thereon is ejected to the exit tray, and
    the controller determines whether or not the sheet is placed on the document loading tray when a wait period has elapsed from a start of the time measurement processing.

8. The inkjet recording apparatus according to claim 7, further comprising
a display configured to display a message, wherein
when determining that the sheet is not placed on the document loading tray, the controller causes the display to display a message that instructs restart of processing from formation of the sample image on the sheet by the recording head.

* * * * *